H. C. BRACEY.
SPIRIT LEVEL.
APPLICATION FILED FEB. 27, 1914.
1,129,785.
Patented Feb. 23, 1915.
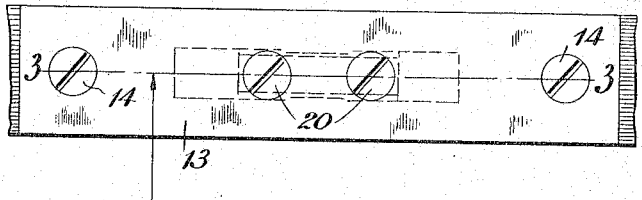
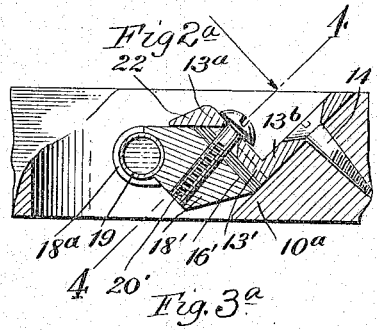
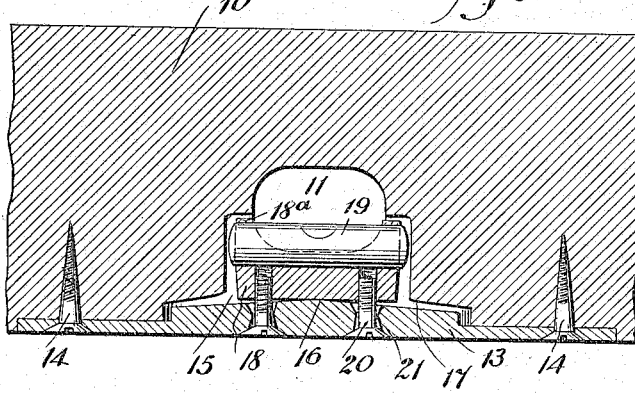
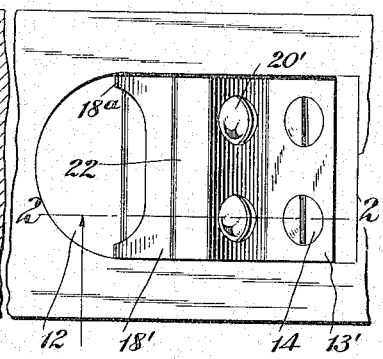
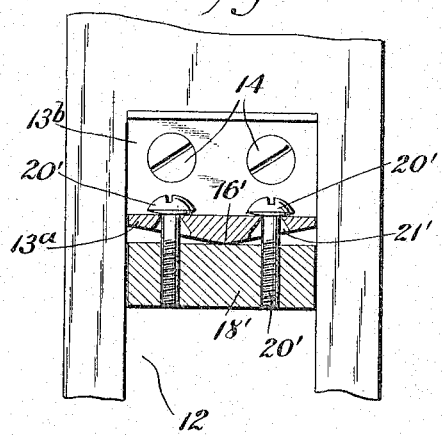
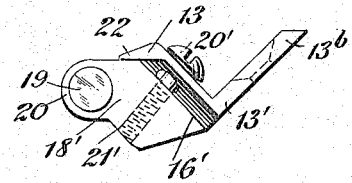
WITNESSES
INVENTOR
Henry C. Bracey
BY
ATTORNEYS

UNITED STATES PATENT OFFICE.

HENRY CHARLES BRACEY, OF NEW YORK, N. Y.

SPIRIT-LEVEL.

1,129,785.　　　　Specification of Letters Patent.　　Patented Feb. 23, 1915.

Application filed February 27, 1914.　Serial No. 821,404.

*To all whom it may concern:*

Be it known that I, HENRY C. BRACEY, a citizen of the United States, and a resident of the city of New York, borough of Manhattan, in the county and State of New York, have invented a new and Improved Spirit-Level, of which the following is a full, clear, and exact description.

This invention relates to instruments of precision and has particular reference to spirit levels such as are commonly used by carpenters, builders, masons or other artisans.

Among the objects of the invention is to provide a spirit level comprising a stock of a minimum cross sectional area, the same being equipped with any suitable number of gage glasses mounted in adjustable supports whereby the glasses may be delicately and accurately adjusted for the purposes of the implement.

The foregoing and other objects of the invention will hereinafter be more fully described and claimed and illustrated in the drawings forming a part of this specification in which like characters of reference indicate corresponding parts in all the views, and in which Figure 1 is a side elevation of a spirit level made in accordance with this invention; Fig. 2 is a bottom edge view of a part of the device; Fig. 2ª is a sectional view on the line 2—2 of Fig. 3ª; Fig. 3 is a sectional view on the line 3—3 of Fig. 2; Fig. 3ª is a plan view of the part shown in Fig. 2ª; Fig. 4 is a sectional detail on the line 4—4 of Fig. 2ª; and Fig. 5 is an end view of one of the gage glass mountings.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings, I show at 10 a stock of any suitable length and of cross sectional area of relatively small dimension so as to be easily grasped by the hand and manipulated. This stock is provided with a plurality of sight openings 11 and 12 formed therethrough from the front face to the rear face and between the top and bottom edges. Any suitable number of these sight openings may be provided and each of them is fitted with a gage glass in suitable adjustable mountings or otherwise.

The arrangement with respect to the sight opening 11 for use of the spirit level for horizontal purposes is such as to comprise a base or anchor plate 13 countersunk into the bottom edge of the stock and there secured in a fixed position by permanent fasteners such as screws 14. The middle portion of the anchor plate 13 extends into a cavity 15 in the stock between the sight opening and the lower edge of the stock and is provided with a transversely extending fulcrum 16 formed by the intersection of two plane surfaces 17 in an obtuse angle at the center of the plate 13. A cradle 18 coöperates with said fulcrum 16 and carries a gage glass 19. The sight openings being formed entirely through the stock from one face to the other, and the gage glasses being mounted directly in the openings, the readings may be made through the openings from either face of the stock. The gage glass is permanently fitted to the cradle in any suitable manner as by straps 18ª. The cradle is shown as having a flat face or bottom which is engaged by the fulcrum 16, but it is obvious that the anchor plate might be flat and the beveled faces formed on the bottom of the cradle without varying from the spirit and advantages of the invention. The cradle is adjusted and held in position with respect to the anchor plate preferably by a pair of screws 20 operating through countersunk openings 21 in the anchor plate and tapped into holes 22 of the cradle. The plate 13 being secured rigidly and permanently in place in the stock and with the glass 19 secured rigidly in the cradle, the gage glass and the cradle may be adjusted so as to make the indication of the glass precisely parallel with the bottom edge of the stick by loosening one of the screws 20 and tightening the other one until the desired position of the gage glass is secured, when both of the screws will be tightened, holding the gage glass in adjusted position. By countersinking or flaring the holes 21 I provide sufficient lateral movement for the screws 20 to provide for the necessary rocking of the cradle over the anchor plate for the purposes of adjustment.

The gage glass mountings shown in connection with the sight openings 12 are intended for use with the stock in vertical position. These devices being duplicates, a specific description of one will be understood as being applicable to any number thereof. In this form of the device the anchor plate 13' is of angular construction and is secured to an inclined portion 10ª of the stock by means of substantial screws 14. By reason of the inclined portion 10ª the entire device may be secured within the planes of the stock, and by reason of the angular formation of the anchor plate 13' the securing and adjusting of the device may all be accomplished readily by a screw driver or the like from the outside of the stock. As in the other form of the invention, I provide a fulcrum projection 16' formed on that portion of the anchor member indicated by the numeral 13ª and arranged at right angles to the flange 13ᵇ through which the clamping screws 14 operate. The inclined portion 10ª of the stock is arranged preferably at an angle of 45 degrees with the side faces of the stock and hence the fulcrum edge 16' has a similar inclination in the opposite direction to said side faces. Extending along the free edge of the anchor portion 13ª is a lip 22, the inner face of which is substantially parallel to the side faces of the stock and on opposite sides of the fulcrum line 16' the member 13ª is provided with countersunk holes 21' whose axes are substantially parallel to the inclined surface 10ª and through which binding screws 20' operate. A cradle 18' is clamped to the anchor plate 13' by said screws 20' in a manner similar to that above described, but the cradle just referred to is of slightly different form because of its coöperation with the angularly related anchor member and the lip 22 extending at an obtuse angle therefrom. The cradle is fitted in said angle substantially tightly and the function of the lip is to insure the axis of the gage glass being maintained substantially parallel to the faces of the stock even though the cradle is caused to rock more or less during adjustment around the line 16' at an oblique angle to the face of the lip 22. The action of the screws 20' causing the adjustment of the cradle has a tendency to cause the ends of the cradles to swing around an axis midway between the screws, but this tendency is of not much consequence due to the fact that the actual extent of adjustment is not great. Any movement, however, that may be required in this direction is provided for by the countersinking of the holes 21'.

Having thus described my invention, I claim as new and desire to secure by Letters Patent:—

1. The combination with a stock having a sight opening formed entirely therethrough from front to rear, of an anchor plate secured in fixed position in said stock, adjacent said sight opening and having countersunk holes therethrough, a cradle coöperating with said plate, one of the coöperating parts having a fulcrum line formed by two intersecting beveled surfaces and the other of said coöperating parts having a flat face bearing thereupon, a pair of adjusting screws operating through said countersunk holes in the anchor plate and having threaded engagement with said cradle, and a gage glass fixed to and carried permanently by the cradle directly in said opening whereby it may be seen from either face of the stock.

2. The combination with a stock having top and bottom edges and front and rear faces and having a sight opening formed therethrough from front to rear, one end of the opening being bounded by a surface inclined to the faces of the stock, of an anchor plate of angular construction secured within the opening against said inclined surface, a cradle coöperating with and adapted to rock upon said angularly formed anchor plate within the sight opening, means coöperating with the anchor plate and cradle to adjust the cradle and secure it in adjusted position, and means to maintain the cradle in parallel relation to the faces of the stock.

3. The combination of a stock having a sight opening therein bounded at one end by a surface inclined to an angle of 45 degrees to the front and rear faces of the stock, an anchor plate having portions disposed at right angles to each other, one of such portions being secured against said inclined surface within the opening, that portion of the anchor plate remote from the inclined surface being provided with countersunk holes, the axes of which are parallel to the inclined surface of the stock, a cradle fitted to and adapted to rock upon the last mentioned portion of the anchor plate, adjusting screws passing through said countersunk holes and into the cradle, a sight glass secured in the cradle, and means associated with the anchor plate and coöperating with the cradle to maintain it and the glass in proper relation to the faces of the stock.

In testimony whereof I have signed my name to this specification in the presence of two subscribing witnesses.

HENRY CHARLES BRACEY.

Witnesses:
 GEO. L. BEELER,
 PHILIP D. ROLLHAUS.

Copies of this patent may be obtained for five cents each, by addressing the "Commissioner of Patents, Washington, D. C."